3,156,674
ADDITION POLYMERS OF ALKENYL EPOXY ETHERS, ETHYLENICALLY UNSATURATED ALCOHOLS AND MONOETHYLENICALLY UNSATURATED HYDROCARBONS, AND CURED PRODUCTS PREPARED THEREFROM
Edward C. Shokal, Walnut Creek, and Paul A. Devlin and De Loss E. Winkler, Orinda, Calif., assignors to Shell Oil Company, a corporation of Delaware
No Drawing. Filed Jan. 30, 1959, Ser. No. 790,066
13 Claims. (Cl. 260—80.7)

This invention relates to a new class of polyepoxides. More particularly, the invention relates to new polyepoxides prepared from alkenyl epoxy ethers, and to cured products prepared therefrom.

Specifically, the invention provides new and particularly useful polyepoxides comprising addition copolymers of an alkenyl epoxy ether and an ethylenically unsaturated alcohol, and preferably an allylic alcohol. As a special embodiment, the invention provides special terpolymers having outstanding properties, particularly in the preparation of coatings, which comprise terpolymers of an alkenyl glycidyl ether, an ethylenically unsaturated alcohol, such as, for example, allyl alcohol, and a dissimilar ethylenically unsaturated monomer, and preferably a hydrocarbon, such as styrene, butadiene or isoprene.

The invention further provides cured products obtained by reacting the above-described new polyepoxides with epoxy curing agents, such as amines, acids, anhydrides, salts and the like.

This application is a continuation-in-part of our copending application Serial No. 723,096, filed March 24, 1958, now U.S. Patent No. 3,040,010, which, in turn, is a continuation-in-part of our application Serial No. 34,346, filed June 21, 1948, now U.S. Patent No. 2,585,506, and Serial No. 163,778, filed May 23, 1950, now U.S. Patent No. 2,839,514 issued June 17, 1958.

It is an object of the invention to provide a new class of polyepoxides. It is a further object to provide new polyepoxides that can be cured with agents, such as polyamines, to form coating compositions having excellent resistance to loss of gloss and excellent chemical and solvent resistance. It is a further object to provide new polyepoxides that can be used to form coatings having improved chalk resistance. It is a further object to provide new polyepoxides that can be cured to form coatings having good impact resistance. It is a further object to provide new polyepoxides that have good resistance to discoloration on outdoor exposure. It is a further object to provide new glycidyl ethers that can be utilized to provide new polymeric curing agents for other polyepoxides. These and other objects of the invention will be apparent from the following detailed description thereof.

It has now been discovered that these and other objects may be accomplished by the new copolymers of the present invention comprising the product of polymerization of an alkenyl epoxy ether and an ethylenically unsaturated alcohol, and preferably an allylic alcohol, and the new terpolymers of the invention comprising the product of polymerization of an alkenyl epoxy ether, an ethylenically unsaturated alcohol, and a dissimilar ethylenically unsaturated monomer, and preferably an unsaturated hydrocarbon such as styrene and butadiene. It has been found that these polymers, and particularly those containing the third monomer component, have outstanding properties which make them useful and valuable in industry. It has been found, for example, that these copolymers can be cured with agents, such as polyamines, to form hard tough coatings which have excellent resistance to loss of gloss. This was quite unexpected in view of the fact that coatings prepared from many other types of polyepoxides have coatings having rather poor gloss retention. Further, the resulting coatings also have better resistance to chalking than the conventional epoxy resin coatings. In addition, the coatings have improved resistance to discoloration on outdoor exposure. Further, the new polymers can be cured with agents, such as amines and anhydrides, to form strong tough coatings which have good flexibility and impact resistance. The new polymers of the invention also find application in the preparation of new polymeric curing agents for other polyepoxide materials, and preferably the glycidyl ethers of polyhydric phenols, as by reaction with amines, polybasic acids and the like in controlled proportions as noted hereinafter.

The alkenyl epoxy ethers used in making the polymers of the invention include those of the formula R—O—X wherein R is an alkenyl radical and X is an epoxy-substituted hydrocarbon radical, and preferably an epoxyalkyl or epoxycycloalkyl radical as a glycidyl radical. Allyl glycidyl ether is the preferred monomer to be used, but other monomers having this formula may also be employed if desired. The related monoethers may contain any alkenyl group, such as a vinyl propenyl, isopropenyl, methallyl, crotyl, 3-butenyl or oleyl radical, for example, there being no restriction on the position of the double bond, the number of carbon atoms or the isomeric structure thereof. Examples of the epoxy-substituted hydrocarbon radicals include, among others, glycidyl, 1-methylglycidyl, 1-butylglycidyl, 2-methylglycidyl, 2-isopropylglycidyl, 2-hexylglycidyl, 3-methylglycidyl, or 3-isopentylglycidyl radicals, and 2,3-epoxycyclohexyl, 3,4-epoxycyclohexyl, 3,4-epoxybutyl and the like. Representative, but non-limiting, compounds employed as essential constituents in preparing the copolymers of the invention include allyl glycidyl monoether, allyl epoxycyclohexyl ether, methallyl glycidyl monoether, crotyl glycidyl monoether, tiglyl glycidyl monoether, vinyl glycidyl monoether, isopropenyl glycidyl monoether, 4-pentenyl glycidyl monoether, 3-buten-2-yl glycidyl monoether, allyl 2-methylglycidyl monoether, methallyl 3-isopropylglycidyl monoether, vinyl 2-ethylglycidyl monoether, oleyl 3-methylglycidyl monoether, and the like. A desirable sub-group of the general class is an alkenyl glycidyl monoether having the olefinic double bond between the second and third carbon atoms of the alkenyl group with the third carbon atom being the carbon atom of a terminal methylene group, which monoether contains 6 to 10 carbon atoms. More generally, it is preferred that the alkenyl group of the alkenyl glycidyl monoether have the olefinic double bond joined to the second carbon atom thereof owing to greater case of polymerizing compounds of such structure than with compounds having the olefinic double bond more remotely situated from the ethereal oxygen atom.

The monomer to be copolymerized with the above-described alkenyl epoxy monoethers comprise the ethylenically unsaturated alcohols and preferably the aliphatic and cycloaliphatic monohydric alcohols possessing an ethylenic group, such as allyl alcohol, chloroallyl alcohol, methallyl alcohol, beta-phenylallyl alcohol, crotyl alcohol, vinyl alcohol (which requires special preparation methods known to the art), cyclohexenol, vinylcyclohexanol and the like. Particularly preferred are the allylic alcohols, i.e., those of the formula ROH wherein R is a hydrocarbon having an ethylenic group in the beta, gamma position relative to the OH group, and preferably containing from 3 to 18 carbon atoms.

The dissimilar monomer employed in the preparation of the terpolymers having the superior properties as coatings may be those having one or more ethylenic groups, such as, for example, styrene, alpha-methylstyrene, p-methoxystyrene, p-octylstyrene, vinyl toluene, beta-vinyl naphthalene, 2,4-dichlorostyrene, 3,5-dimethylstyrene, chlorostyrene, butadiene, isoprene, 1,3-dimethylpentadiene, cyclopentadiene, propylene, butylene, acrylonitrile, vinyl ethyl ether, vinyl butyl ether, vinyl acetate, allyl acetate, allyl benzoate, vinyl benzoate, allyl stearate, allyl cyclohexanecarboxylate, acrylonitrile, methacrylonitrile, methyl methacrylate, octyl acrylate, allyl acrylate, vinyl chloride, vinyl cyanide, diallyl phthalate, divinyl succinate, allyloxypropionaldehyde, diallyl ether of ethylene glycol, triallyl ether of glycerol, allyl-ether of pentaerythritol, N-allyl acrylamide, and the like, and mixtures thereof.

Particularly preferred dissimilar monomers to be used include the unsaturated hydrocarbons containing up to 15 carbon atoms, and preferably the mono- and diethylenically unsaturated aliphatic, cycloaliphatic and aromatic substituted aliphatic hydrocarbons containing up to 10 carbon atoms, such as styrene, butadiene, isoprene and the like; and the alkenyl alkyl ethers and alkenyl esters.

The polymers of the invention are prepared by heating the mixture of monomers in the presence of a polymerization catalyst having an oxygen atom linked directly to another oxygen atom, which catalyst is no more acidic than acetic acid, as is the case with benzoyl peroxide, acetyl peroxide, cumene hydroperoxide, lauroyl peroxide, tertiary-butyl hydroperoxide, di-tertiary-butyl peroxide, 2,2-bis(tertiary-butyl peroxy) butane and like peroxides, as well as molecular oxygen, relatively pure or diluted with inert gas, e.g., nitrogen, methane, etc. When using peroxides, about 0.1% to 5% is suitable, although larger or smaller proportions may be employed if desired. Molecular oxygen is used as catalyst by bubbling or dispersing the gas into and through the liquid polymerization mixture. The amount of oxygen employed may be varied over extremely wide limits with little or no effect on the course of the copolymerization.

The polymerization is conducted with the polymerizing mixture in liquid phase at about 50° C. to 300° C. Ordinary reflux temperature is often convenient although this temperature is usually too low to effect the copolymerization with desired rapidity. Consequently, it is usually preferable to operate at about 125° C. to 250° C., at which temperatures it may be necessary to employ superatmospheric pressure, such as from 100 to 300 pounds per square inch or even higher in order to keep the polymerizing mixture in liquid phase.

While it is usually desirable to effect the polymerization without the presence of other added substances than the polymerizing compounds and the catalyst, it is sometimes convenient to also have present an inert solvent, such as hexane, benzene, toluene, or xylene. The use of such inert solvents is advantageous for enabling the polymerizing mixture to be fluidly liquid under the polymerizing conditions with compounds of higher molecular weight.

In some cases, the polymerization is effected by adding one or more of the compounds to the polymerizing mixture during the course of the copolymerization. This procedure is especially useful with mixtures wherein one compound polymerizes at a much faster rate than the other. In such cases, the faster polymerizing compound is added continuously or intermittently during the copolymerization.

Depending upon the use to which the copolymer is put, the proportion of alkenyl epoxy monoether to the other polymerizable compound or compounds is varied to considerable extent in the mixture subjected to copolymerization. In some cases, it is desirable to have a copolymer with a large epoxide content while in others, the epoxide content is desired to be low. Preferably, the copolymer should contain from 10% to 99% by weight of the copolymer, and still more preferably, 20% to 98% by weight. The unsaturated alcohol preferably makes up from 1% to 90% by weight, and more preferably, 2% to 80% by weight. When the third monomer is used, it preferably makes up from 80% to 1% by weight of the copolymer. Preferred copolymers have the following composition alkenyl epoxy ether, 10% to 90%; unsaturated alcohol, .5% to 20%; third monomer, 1% to 60%; the total being 100%. Particularly preferred are those copolymers containing 30% to 60% by weight of styrene.

In broad aspect, the copolymers of the invention contain unaltered epoxy groups of the epoxy monoether so that the copolymers have an epoxide value of from 0.01 equivalent of epoxide per 100 grams up to 90% of the theoretical epoxide value of the epoxy monoether. Copolymers with up to 50% of the theoretical value have excellent properties. The copolymers thus possess an appreciable amount of epoxide content while at the same time they also contain chemically combined in the macromolecules thereof, a substantial proportion of polymerizable compounds other than are derived from the glycidyl monoether and thereby have their properties favorably changed to unexpected extent.

In those cases of copolymers of allyl glycidyl monoether and the allylic alcohols, the copolymers with excellent properties have epoxide values from about 0.1 to 0.6 epoxide equivalent per 100 grams of copolymer. Very suitable copolymers of allyl glycidyl monoether, allyl alcohol and one other of the polymerizable compound such as styrene or vinyl acetate have epoxide values of from about 0.01 to 0.5 epoxide equivalent per 100 grams.

The epoxide value referred to herein as so many epoxide equivalents per 100 grams of polymer is determined in the following manner. Dry hydrogen chloride gas in amount of about 35 grams is slowly bubbled into and absorbed by a solution of 75 grams pyridine in 400 ml. dry chloroform cooled in an ice-water bath. After the absorption, a sample of the solution is titrated with standardized 0.5 N methanol solution of sodium hydroxide, and then pyridine sufficient to neutralize free hydrogen chloride, if any, is added to the solution so about a 5% excess of pyridine is present. The solution is then diluted with chloroform to one liter and the normality checked by titration using phenolphthalein as indicator. To determine the epoxide value of a copolymer, a stoichiometric excess of the standardized pyridinium chloride solution is added to a weighed sample of copolymer and the mixture is boiled under a reflux condenser for 30 minutes whereby the pyridinium chloride hydrochlorinates the epoxy groups to chlorhydrin groups. After cooling, the excess pyridinium chloride is back titrated with the standardized 0.5 N methanolic sodium hydroxide to the phenolphthalein end point. The epoxide value is calculated by considering one HCl of the reacted pyridinium chloride as equivalent to one epoxide group.

In preparing the copolymers, the polymerization of the entire monomer mixture is ordinarily not carried to completion. Instead, copolymerization is usually continued until about 10% to 80% of the monomer mixture is converted to copolymer and then the unpolymerized monomers are separated from the formed copolymer by distillation, preferably under reduced pressure. The copolymer obtained in this manner is substantially free of unpolymerized monomers, and solvents, if the latter are employed. The separated copolymers vary from viscous liquids to brittle solids in consistency.

The above-described new copolymers may be cured to insoluble infusible products by reaction with an epoxy curing agent. Examples of these include, among others, amines, amino-containing polyamides, acids, acid anhydrides, salts, mercaptans, hydrazines, $BF_3$-complexes, and the like, and mixtures thereof. Specific examples of such materials include, among others, p-phenylene diamine, diaminodiphenylsulfone, p,p'-methylene dianiline, p,p-diaminodiphenylmethane, triaminobenzene, 2,4-diaminotoluene, tetraaminobenzene, 3,3'-diamino diphenyl, 1,3-diamino - 4 - isopropylbenzene, 1,3 - diamino - 4,5 - diethylbenzene, diaminostilbene, triethylamine, ethylene diamine, diethylamine, diethylene triamine, triethylene tetramine, tetraethylene pentamine, pyridine, diaminopyridine, piperidine, N,N'-diethyl-1,3-propane-diamine, dicyandiamide, melamine, fatty acid salts of amines, such as the 2-ethylhexoate of tris(dimethylaminomethyl)phenol, adducts of polyepoxides, such as those described hereinafter, and the above-described mono- and polyamines, as the adduct of p-phenylene diamine and styrene oxide, the adduct of p-phenylene diamine and allyl glycidyl ether, the adduct of diglycidyl ether of 2,2-bis(4-hydroxyphenyl)propane and diethylene triamine, the adduct of diethylene triamine and ethylene oxide, the adduct of diethylene triamine and styrene oxide, the adducts of polyamines and unsaturated nitriles, such as the adduct of diethylene triamine and acrylonitrile, the adduct of diethylene triamine and unsaturated sulfolanes, and the adduct of p-phenylene diamine and acrylonitrile.

Other examples include the amino-containing polyamides as described in U.S. Patent No. 2,450,940 and the monomeric amides described in U.S. Patent No. 2,832,799.

Other examples include the acid anhydrides, such as phthalic anhydride, succinic anhydride, dodecenylsuccinic anhydride, maleic anhydride, tetrahydrophthalic anhydride, pyromellitic anhydride, hexachlorophthalic anhydride, methyl Nadic anhydride, anhydrides obtained by reacting maleic anhydride with unsaturated compounds, such as oils, terpinene, long chain unsaturated acids and the like, as well as anhydrides obtained by reacting long chain acids with acetic anhydride, and the like.

Still other examples include the salts, such as magnesium perchlorate, zinc fluoborate, potassium persulfate, copper fluoborate, cupric arsenate, zinc persulfate, cupric fluosilicate, cupric iodate, cupric sulfate, magnesium nitrate, magnesium phosphate, stannic fluoborate, zinc nitrate, and the like, as well as the chloride derivatives as aluminum chloride, zinc chloride, ferric chloride and the like.

Still other examples include the $BF_3$ adducts with various materials, such as amines, amides, ethers, phenols and the like.

The amount of the curing agents employed will also vary over a wide range. The amount of the curing agents having active hydrogen as well as the agents such as acid anhydrides are preferably employed so as to furnish at least .6 equivalent, and still more preferably, .8 to 1.5 equivalents per equivalent of the polyepoxide. As used herein in relation to the amount of curing agent, "equivalent" means that amount needed to furnish 1 active hydrogen or anhydride group per epoxy group. The other curing agents, such as metal salts, tertiary amines, $BF_3$, and the like are preferably used in amounts varying from about .1% to 6% by weight of the material being cured.

The copolymers and curing agent may be mixed together alone or with a diluent or solvent. Various solvents that are suitable for achieving fluidity of the polyepoxide mixtures include, among others, ketones like acetone, methyl ethyl ketone, methyl isobutyl ketone, isophorone, etc., esters such as ethyl acetate, butyl acetate, Cellosolve acetate (ethylene glycol monoacetate), methyl Cellosolve acetate (acetate of ethylene glycol monomethyl ether), etc.; ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethyl phthalate or liquid monoepoxy compounds including glycidyl allyl ether, glycidyl phenyl ether, styrene oxide, and the like, as well as cyano-substituted hydrocarbons, such as acetonitrile. It is also convenient to employ a glycidyl polyether of the dihydric phenol in admixture with a normally liquid glycidyl polyether of a polyhydric alcohol.

The new copolymers of the invention may be used for a great variety of important applications. As noted above, they are particularly useful in the preparation of surface coating compositions. The surface coatings may be those which are cured at room temperature or those which are cured by the application of heat, such as baking enamels. In this application, it is generally desirable to combine the copolymer with the desired solvent or other film forming materials and/or pigments and the necessary curing agents and then applying this mixture to the surface to be coated. The coatings may be allowed to set at room temperature or heated according to the type of curing agent employed. Coatings may be applied to a great variety of surfaces, such as wood, metals, plaster, concrete and the like. As noted above, the coatings are particularly superior for use in outdoor applications because they give films which have good resistance to loss of gloss, resistance to chalking, and good resistance to discoloration by ultra-violet light.

The copolymers of the invention may also be used in other applications, such as in the application of castings and moldings and for the incapsulation of electrical equipment that are used in the preparation of laminated articles and are also useful for the preparation of metal-to-metal adhesives.

The new copolymers of the invention are also useful in the preparation of curing agents for use with other polyepoxide materials. In this application, they are reacted with material, such as polyamines, polycarboxylic acids, polymercaptans, and the like, to form new derivatives that can be further reacted with polyepoxides.

The following examples illustrate the invention, but it is to be understood that the scope of the invention is not to be construed as limited to details therein. The parts are by weight.

*Example I*

1140 parts of allyl glycidyl ether, 229 parts of allyl alcohol, 50 parts of styrene and 15 parts of ditertiary butyl peroxide were placed in a reaction flask and the mixture heated at 140° C. for about 30 minutes. At that time, a mixture of about 228 parts of allyl glycidyl, 58 parts of allyl alcohol, and 250 parts of styrene and 25 parts of ditertiary butyl peroxide was added to the reaction mixture at the rate of about 240 parts per hour over a period of three hours. The mixture was then heated for an additional hour at 140° C. The resulting copolymer was a tacky solid having an epoxy value of 0.324 equivalent per 100 grams and a molecular weight of about 900.

A coating composition was preparaed from the above-described copolymer by making a 40% solid solution of the copolymer in xylene methyl isobutyl ketone mixture and combining this with an equal part (on solids) of $TiO_2$ 11.3 parts (per 100 parts of the copolymer) of N-aminoethyl piperazine was added. The resulting composition was spread out as a thin film upon tin panels and the coatings baked at 20° C. The resulting films had good resistance to solvents, such as xylene and methyl isobutyl ketone and had excellent resistance to boiling water and boiling 20° sodium hydroxide. On outdoor exposure the resulting films also displayed excellent resistance to discoloration and good resistance to chalking and loss of gloss. The coatings were superior in this regard to a control prepared from a solid glycidyl polyether of 2,2-bis(4-hydroxyphenyl)propane.

Related coatings were prepared using a polyamide of diethylene triamine and dimerized linoleic acid as the curing agent in an amount of 46 parts per 100 parts of the copolymer. Related superior results are obtained.

*Example II*

36 parts of allyl glycidyl ether and 14 parts of allyl alcohol were combined together with 2 parts of ditertiary butyl peroxide and the mixture heated to 140° C. for 5 hours. During that time, 50 parts of styrene was added at the rate of about 17 parts per hour. The resulting product was a sticky solid having an epoxy value of .26 eq./100 g. and a molecular weight of 835.

Coating compositions were prepared from the above prepared copolymer by adding the copolymer to xylene to form a solution having about 30% solids, 5% N-amino ethyl piperazine was added to the coating composition and the mixture spread out as a thin film on tin panels. The coatings were then dried at 20° C. The resulting coatings were very hard and tough and had good resistance to xylene and methyl isobutyl ketones and good resistance to water. The coatings also showed good resistance to discoloration, good resistance to chalking when exposed to outdoor and loss of gloss conditions.

*Example III*

A mixture of 10 parts allyl glycidyl ether, 80 parts allyl alcohol and 10 parts of styrene was heated for 2 hours at 180° C under a pressure of 120 pounds per square inch while bubbling air therethrough. The formed copolymer obtained in 28.2% conversion was a brittle solid containing 34.1% styrene and having a molecular weight of 629, an epoxide value of 0.01 equivalent per 100 grams, hydroxyl value of 0.76 equivalent per 100 grams, and a Durran's Mercury Method softening point of 58° C.

100 parts of this polymer was combined with 20 parts of diethylene triamine and the mixture heated at 60° C. In a few hours the mixture had set up to form a hard tough insoluble (in acetone) casting.

Coatings prepared from this copolymer as in Example I are very hard and tough and have good resistance to chalking and loss of gloss.

*Example IV*

A mixture of 30 parts allyl glycidyl ether, 60 parts allyl alcohol and 10 parts styrene was copolymerized as described in Example I whereby a semi-solid copolymer was obtained in 38.8% conversion. The copolymer had a molecular weight of 850, an epoxide value of 0.078 equivalent per 100 grams, a hydroxyl value of 0.077 equivalent per 100 grams and a Durran's Mercury Method softening point of 51° C. It contained 69.7% carbon and 8.9% hydrogen.

100 parts of this polymer was combined with 20 parts of diethylene triamine and the mixture heated at 60° C. In a few hours the mixture had set up to form a hard tough insoluble (in acetone) casting.

Coatings prepared from this copolymer as in Example I are very hard and tough and have good resistance to chalking and loss of gloss.

*Example V*

A mixture of 50 parts allyl glycidyl ether, 25 parts allyl alcohol, and 25 parts styrene was heated for 1 hour at 180° C. under a pressure of 100 pounds per square inch in the presence of bubbled air. The resulting copolymer was a semi-solid and was obtained in a conversion of 37.3%.

100 parts of the above-described polymer was heated with 20 parts of diethylene triamine and the mixture heated at 60° C. The resulting product was a hard tough insoluble (in acetone) casting.

Coatings prepared from this copolymer as in Example I are very hard and tough and have good resistance to chalking and loss of gloss.

*Example VI*

A mixture of 80 parts allyl glycidyl ether, 10 parts allyl alcohol, and 10 parts styrene was copolymerized as described in Example I. A viscous copolymer was obtained in 23.6% conversion which contained 44.7% styrene and had a molecular weight of 760, an epoxide value of 0.40 equivalent per 100 grams, and a hydroxyl value of 0.22 equivalent per 100 grams. The copolymer contained 71.8% carbon and 8.4% hydrogen.

100 parts of the above-described polymer was heated with 20 parts of diethylene triamine and the mixture heated at 60° C. The resulting product was a hard tough insoluble (in acetone) casting.

Coatings prepared from this copolymer as in Example I are very hard and tough and have good resistance to chalking and loss of gloss.

*Example VII*

116 parts of allyl alcohol, 57 parts allyl glycidyl ether, 72 parts of vinyl ethyl ether and 5 parts of ditertiary butyl peroxide were placed in a reaction flask and the mixture heated at 140° for 5 hours. The resulting product was a viscous having an epoxy value of .181 equivalent per 100 grams.

The coating composition was prepared from the above copolymer by adding the copolymer to xylene to form a 30% solid solution, 5% diethylene triamine and the mixture spread out as a thin film on tin panels and the coating baked at 170° C. for one hour. The resulting coating was hard and tough and had good solvents and water resistance.

*Example VIII*

A mixture of 70 parts of allyl glycidyl ether, 20 parts of allyl alcohol, 10 parts of butadiene, and 5 parts of ditertiary butyl peroxide were heated at 120° for several hours. The resulting copolymer was a solid having a molecular weight of about 1,000.

100 parts of this copolymer was combined with 20 parts of diethylene triamine and the mixture heated at 60° C. In a few hours the mixture had set up to form a hard tough insoluble casting.

*Example IX*

A mixture of 60 parts allyl glycidyl ether, 30 parts of allyl alcohol and 10 parts of lauryl methacrylate and 5 parts of ditertiary butyl peroxide were combined together and heated at 120° C. for several hours. The resulting copolymer was a sticky solid.

100 parts of this copolymer was combined with 20 parts of diethylene triamine and the mixture heated at 60° C. In a few hours the mixture had set up to form a hard tough insoluble casting.

We claim as our invention:

1. A polyepoxide consisting of the addition polymer of (1) 10% to 99% by weight of an epoxy ether of the group consisting of alkenyl glycidyl ethers and alkenyl vic-epoxy cycloalkyl ethers, (2) 1% to 90% by weight of an ethylenically unsaturated alcohol, and (3) 1% to 60% by weight of a dissimilar monomer of the group consisting of monoethylenically unsaturated monomer containing 2 to 15 carbon atoms, and diethylenically unsaturated aliphatic hydrocarbons containing from 4 to 10 carbon atoms.

2. A polyepoxide comprising the addition polymer of 10% to 90% by weight of an alkenyl glycidyl ether, from .5% to 20% by weight of an allylic alcohol and from 1% to 60% by weight of an ethylenically unsaturated hydrocarbon containing from 2 to 15 carbon atoms, the total amount of the proportions of the three components making 100%.

3. A polyepoxide comprising the addition polymer of 10% to 90% by weight of an alkenyl glycidyl ether, .5% to 20% by weight of allyl alcohol and 1% to 60% by weight of a dissimilar mono-ethylenically unsaturated monomer containing 2 to 15 carbon atoms, the total amount of the proportions of the three components being 100%.

4. A polyepoxide as in claim 3 wherein the unsaturated monomer is styrene.

5. A polyepoxide as in claim 13 wherein the unsaturated monomer is butadiene.

6. A polyepoxide as in claim 13 wherein the unsaturated monomer is isoprene.

7. A polyepoxide comprising the addition polymer of 10% to 90% by weight of allyl glycidyl ether, .5% to 20% by weight of allyl alcohol and 1% to 60% by weight of styrene, the total amount of the proportions of the three components being 100%.

8. A polyepoxide comprising the addition polymer of 10% to 90% by weight of allyl glycidyl ether, .5% to 20% by weight of allyl alcohol and 1% to 60% by weight of styrene, the total amount of the proportions of the three components being 100%.

9. A cured insoluble infusible product obtained by reacting the polyepoxide of claim 2 with an epoxy curing agent of the group consisting of amines, amino-containing polyamides, polycarboxylic acids, polycarboxylic acid anhydrides, metal salts, polymercaptans, hydrazines and $BF_3$ complexes.

10. A cured insoluble infusible product obtained by reacting the polyepoxide of claim 2 with an amine curing agent.

11. A cured insoluble infusible product obtained by reacting the polyepoxide of claim 5 with an amine curing agent.

12. A polyepoxide comprising the addition polymer of 10% to 90% by weight of an alkenyl glycidyl ether, .5% to 20% by weight of allyl alcohol and 1% to 60% by weight of vinyl ethyl ether, the total amount of the proportions of the three components being 100%.

13. A polyepoxide comprising the addition polymer of 10% to 90% by weight of an alkenyl glycidyl ether, .5% to 20% by weight of allyl alcohol and 1% to 60% by weight of a diethylenically unsaturated aliphatic hydrocarbon containing from 4 to 10 carbon atoms, the total amount of the proportions of the three components being 100%.

References Cited in the file of this patent
UNITED STATES PATENTS

| | | |
|---|---|---|
| 2,441,515 | Snyder | May 11, 1948 |
| 2,450,234 | Evans | Sept. 28, 1948 |
| 2,650,151 | Ham | Aug. 25, 1953 |
| 2,692,876 | Cupery | Oct. 26, 1954 |
| 2,839,514 | Shokal et al. | June 17, 1958 |